United States Patent
Schmidt

(10) Patent No.: US 8,797,383 B2
(45) Date of Patent: Aug. 5, 2014

(54) METHOD FOR STEREOSCOPIC ILLUSTRATION

(75) Inventor: Alexander Schmidt, Erfurt (DE)

(73) Assignee: Visumotion International Ltd., Wanchai (HK)

( * ) Notice: Subject to any disclaimer, the term of this patent is extended or adjusted under 35 U.S.C. 154(b) by 296 days.

(21) Appl. No.: 13/318,999

(22) PCT Filed: May 6, 2010

(86) PCT No.: PCT/EP2010/056150
§ 371 (c)(1),
(2), (4) Date: Jan. 23, 2012

(87) PCT Pub. No.: WO2010/128097
PCT Pub. Date: Nov. 11, 2010

(65) Prior Publication Data
US 2012/0133651 A1     May 31, 2012

(30) Foreign Application Priority Data

May 6, 2009 (DE) .......................... 10 2009 020 158

(51) Int. Cl.
*H04N 13/00* (2006.01)
*H04N 13/04* (2006.01)

(52) U.S. Cl.
USPC ................................. 348/42; 348/43; 348/51

(58) Field of Classification Search
None
See application file for complete search history.

(56) References Cited

U.S. PATENT DOCUMENTS

| | | | |
|---|---|---|---|
| 5,119,442 A * | 6/1992 | Brown | 382/235 |
| 5,929,859 A | 7/1999 | Meijers | |
| 7,046,271 B2 | 5/2006 | Doerfel et al. | |
| 2007/0146364 A1 * | 6/2007 | Aspen | 345/426 |
| 2007/0154082 A1 | 7/2007 | Rhodes | |
| 2007/0195161 A1 | 8/2007 | Nakaya | |

FOREIGN PATENT DOCUMENTS

| | | |
|---|---|---|
| CN | 101025901 A | 8/2007 |
| DE | 100 03 326 A1 | 8/2001 |
| DE | 696 21 778 T2 | 3/2003 |
| WO | WO 97/23097 | 6/1997 |
| WO | WO 01/56302 A1 | 8/2001 |
| WO | WO 2006/136978 A1 | 12/2006 |

OTHER PUBLICATIONS

Oliveira et al., "Real-Time Relief Mapping on Arbitrary Polygonal Surfaces", Instituto de Informática UFRGS, prior to Nov. 29, 2011, 9 pages.

(Continued)

*Primary Examiner* — Heather Jones
(74) *Attorney, Agent, or Firm* — Patterson Thuente Patterson, P.A.

(57) ABSTRACT

The invention relates to a method for the stereoscopic display of a scene on a grid of picture elements (pixels), based on several views that are combined according to a combination rule to form a combination image. The combination image contains only selected parts or pixels of each view. Furthermore, propagation directions are fixed, which make it possible for a viewer to see in the combination image a different selection of views with his left eye than with his right eye, which results in a visual impression of space.
Starting from an original view, in which each pixel contains bits of color information and depth information, the other views are generated, with exclusively such bits of color information being determined that belong to pixels of the views which are displayed in the combination image. The determination of the bits of color information is performed with the aid of a relief card $Z(x,y)$.

18 Claims, 7 Drawing Sheets

(56) References Cited

OTHER PUBLICATIONS

Oliveira et al., "Relief Texture Mapping" Computer Graphics, Siggraph 2000 Conference Proceedings, New Orleans, LA, Jul. 23-28, 2000, 10 pages.

International Preliminary Report on Patentability for International Application No. PCT/EP2010/056150 dated Nov. 15, 2011, 7 pages.
German Language Examination Report, Sep. 27, 2011, 8 pages.
Chinese Office Action for Chinese Patent Application No. 201080019861.4 dated Dec. 24, 2013.

* cited by examiner a)

b)

|   | 1 | 2 | 3 | 4 | 5 | 6 | 7 | 8 | 9 | 10 | 11 |
|---|---|---|---|---|---|---|---|---|---|----|----|
|   | R | G | B | R | G | B | R | G | B | R  | G  |
| 1 | 1 | 2 | 3 | 4 | 0 | 1 | 2 | 3 | 4 | 0  | 1  |
| 2 | 0 | 1 | 2 | 3 | 4 | 0 | 1 | 2 | 3 | 4  | 0  |
| 3 | 4 | 0 | 1 | 2 | 3 | 4 | 0 | 1 | 2 | 3  | 4  |
| 4 | 3 | 4 | 0 | 1 | 2 | 3 | 4 | 0 | 1 | 2  | 3  |
| 5 | 2 | 3 | 4 | 0 | 1 | 2 | 3 | 4 | 0 | 1  | 2  |
| 6 | 1 | 2 | 3 | 4 | 0 | 1 | 2 | 3 | 4 | 0  | 1  |
| 7 | 0 | 1 | 2 | 3 | 4 | 0 | 1 | 2 | 3 | 4  | 0  |

METHOD FOR STEREOSCOPIC ILLUSTRATION

PRIORITY CLAIM

The present application is a National Phase entry of PCT Application No. PCT/EP2010/056150, filed May 6, 2010, which claims priority from German Application Number 102009020158.0, filed May 6, 2009, the disclosures of which are hereby incorporated by reference herein in their entirety.

FIELD OF THE INVENTION

The invention relates to a method for the stereoscopic display of a scene on the basis of several different views $A^n$ of the scene, with $n=0, \ldots, N-1$ and a total number of views $N=2$ or $N>2$, on a grid of picture elements (pixels).

BACKGROUND OF THE INVENTION

While in prior art there are many different methods for displaying three-dimensional images, one of the essential methods permitting three-dimensional images to be viewed without viewing aids is based on combining, according to a specified combination rule for three-dimensional display, the views $A^n$ into a combination image that is displayed on the grid of pixels, in such a way that, according to the combination rule, of each of the views $A^n$, only part of the pixels $b^n(x_k,y_l)$ assigned to the respective view $A^n$ are displayed on the grid of pixels. Also, propagation directions are fixed for the views $A^n$, so that a viewer's left eye perceives a different selection of the views $A^n$ than the viewer's right eye, whereby an impression of three-dimensional vision is produced.

Such combination rules are described, e.g., in DE 100 03 326 A1. The combination rules are always described depending on the properties of the display screen, which must be suitable for three-dimensional display. For example, the display screen may be provided with a special filter array that is composed of transparent and opaque filter elements, so that the propagation directions for the views are determined in an interaction with the combination rule.

An essential aspect of such methods is the generation of the different views, which correspond to different viewing positions. In classical movies, shot for example with stereo cameras or with cameras positioned in the appropriate viewing positions, such views can be digitally recorded and combined, and the time spent thereon does not necessarily matter because the viewer gets to see a finished product that is not variable any more and therefore is static. Unlike this, the generation of the different views in computer-animated objects, such as used, e.g., in navigation devices or computer games, turns out to be a time factor that increases with the resolution of the display screens and the number of views, thus decreasing speed and, despite the grown capacity of graphics cards, disturbing the course of the frame sequences—which, as a rule, have to be regenerated first by interaction with the viewer—and possibly leading, e.g., to jerking.

For all that, prior art knows various methods for generating the views starting from a source view Q. What these methods have in common is that, first, a source view Q projected onto a projection surface $P(x,y)$ with a horizontal coordinate $x$ and a vertical coordinate $y$ is provided, to which is assigned an original viewing position $B^q$. The source view Q is composed of source pixels $b^q(x_i,y_j)$, with rows $j=1, \ldots, J$ and columns $i=1, \ldots, I$. In every source pixel $b^q(x_i,y_j)$, at least one bit of color information is stored. Also provided is a depth card T referenced to the projection surface, to which depth card the original viewing position $B^q$ is also assigned. The depth card is composed of depth pixels $t(x_p,y_r)$ with rows $r=1, \ldots, R$ and columns $p=1, \ldots, P$. In every depth pixel $t(x_p,y_r)$, at least one bit of depth information is stored, with the depth information corresponding to a vertical distance to the projection surface $P(x,y)$. The source or depth pixels may also store further information related to the display. The original viewing position $B^q$ is assigned to a first view $A^0$. Frequently it is selected in such a way that it is positioned opposite to, and centered with, the projection surface, and that a ray from the viewing position $B^q$ to the projection surface, which together with this surface brackets a vertical line, thus approximately pierces the central pixel of the source view Q. Starting from this original viewing position $B^q$, by horizontal shifting of this position, $N-1$ pairs of further, different viewing positions $B^m$ are generated that correspond to the other views $A^m$, with $m=1, \ldots, N-1$. Bits of color information for image pixels $b^n(x_k,y_l)$, with rows $l=1, \ldots, L$ and columns $k=1, \ldots, K$, have to be determined for all views $A^n$.

In the classical approach, e.g. in the unpublished German application No. 10 2006 005 004, an original view $A^0$, here identical to the source view Q, is replicated $(N-1)$-fold. In accordance with the new viewing positions and the bits of depth information of the primitive on which the view is based, the views can then be computed, with the method requiring that all pixels $b^m(x_k,y_l)$ be determined anew for each view.

Another method is described in DE 696 21 778 T2. Starting from an original view $A^0$, for generating the other views each pixel of this view is shifted horizontally to the left or right in proportion to its depth information, a procedure known as parallactic pixel shifting. The result, then, is a view shifted in perspective; any gaps formed are filled up by interpolation. Pixel shifting has to be executed separately for each view.

With all these approaches, the computing time needed greatly increases with the number of views. On the other hand, the use of a great number of views is actually desirable, as this leads to a high-quality three-dimensional viewing impression.

Known from another field of computer graphics is a method called relief mapping. Using this method, one can eliminate a typical artefact of two-dimensional computer graphics applied to the display of three-dimensional objects: the fact that seemingly spatial textures or patterns applied onto a computer-graphic object, on closer examination are actually seen two-rather than three-dimensional. If, e.g., a brickwork texture is applied onto a computer-graphic object intended to show a wall, the texture seen from some distance actually looks like a genuine brick wall, but of the viewing position is very close to, and at an oblique angle to, the wall, the texture appears as what it is, viz. virtually like a two-dimensional decal without any three-dimensional contour. The method of relief mapping makes it possible to eliminate these artefacts and to apply, e.g., to the brick wall described above, a structure that has really a spatial effect and retains this effect also when viewed from unfavorable viewing positions. The method is described in detail in the literature, e.g., in the article "Relief Texture Mapping" by M. Oliveira, G. Bishop and D. McAllister, published in Proceedings of SIGGRAPH 2000, pages 359-368, and in the article "Real-Time Relief Mapping on Arbitrary Polygonal Surfaces" by F. Policarpo, M. Oliveira and J. Comba, published in Proceedings of ACM Symposium on Interactive 3D Graphics and Games 2005, ACM Press, pages 155-162. Herein, reference is explicitly made to these documents. Working similarly to ray tracing, the relief mapping method is employed to make objects displayed in two dimensions look more genuinely three-dimensional. It differs from the ray tracing method mainly in that the latter determines the intersection of a ray with the geometric objects of the 3D scene in order to compute the image of a 3D scene, whereas the relief mapping method exclusively determines the intersection with the depth values of an already completely computed image in order to subsequently change the positions of pixels. It may even be feasible for relief mapping to be applied to an image previously computed by means of ray tracing, since here, too, a depth value was assigned to each pixel. No application of this method with regard to an actually three-dimensional display is known, though.

SUMMARY OF THE INVENTION

Departing from the prior art described, the invention is based on the problem of improving methods of the kind described above to the effect that fast computation of the combination images and, as a consequence, jerk-free display in real time become possible also for a great number of different views.

With a method of the kind described above, the problem is solved in such a way that, on the basis of the depth card, a relief card $Z(x,y)$ of the view is created, with $Z(x,y)$ being a continuous function in x and y, and the relief card $Z(x,y)$ being connected with the source view Q. This is done by means of the relief mapping method described above. After the relief card $Z(x,y)$ has been created, the bits of color information for pixels $b''(x_k,y_l)$ of the views $A''$ can be determined in such a way that (i) a ray along a viewing direction from the respective viewing position $B''$ to the respective pixel $b''(x_k,y_l)$ is generated and extended in depth beyond this pixel, (ii) that intersection of the ray with the relief card $Z(x,y)$ which is closest to viewing position $B''$ is determined, (iii) the source pixel $b^q(x_s^i,y_j)$ closest to the intersection is determined, and (iv) the respective pixel $b''(x_k,y_l)$ is assigned the color information of the pixel $b^q(x_s^i,y_j)$. In this connection it is essential that the bits of color information are not determined for all pixels of the views. Rather, the bits of color information for the views $A''$ are determined only for the pixels $b''(x_k,y_l)$ to be displayed according to the combination rule.

With reference to the grid $x_k$, $y_l$ which is the basis of the pixels of the combination image, this means that, for each pair (k,l) according to the combination rule one first determines from which view the information to be displayed in this position in the combination image originates. The determination of the color information to be displayed is then performed, as described above, on the basis of the viewing direction corresponding to the respective view, that is, for the respective view only. The bits of information of the views not displayed in the grid position $x_k$, $y_l$ will not be determined, unlike in prior art, where these unnecessary operations cannot be avoided because of the methods used. So, for each view $A''$, invariably only that share of the pixels $b''(x_k,y_l)$ is determined which is actually displayed according to the combination rule. This means, the method of relief mapping is not applied completely to each of the views, but only selectively to the pixels visible in the respective view, i.e., depending on the combination rule. It is quite possible that, in a position $(x_k,y_l)$ of a combination image, not only the color information of one but also of two or more of the views is displayed. This depends on the combination rule.

In case that the source view Q and/or the depth card T have a lower or higher resolution than the views $A''$, so that $R \neq L$ and/or $P \neq K$, or, respectively, $J \neq L$ and/or $I \neq K$, a scaling of the depth card T or of the source view Q with appropriate scaling factors is performed. For the depth card T, these scaling factors are $S^T_x=K/P$ for the width, and $S^T_y=L/R$ for the height. For scaling the source view Q, the scaling factors are, accordingly, $S^Q_x=K/I$ for the width and $S^Q_y=L/J$ for the height. In case that the resolutions are equal, it is not absolutely necessary to skip this step; rather, multiplication by the factor 1 can be effected. The scaling factors are applied to the depth pixels $t(x_p,p_r)$ and/or the source pixels $b^q(x_i,y_j)$, so that these are expanded or compressed compared to the pixels $b''(x_k,y_l)$. If, for example, the resolution of the source view and of the depth card, both in the x- and y-directions, is only half the resolution of the display screen on which the views $A''$ are to be displayed and corresponding to whose resolution they are to be generated, the source view Q and the depth card T will be expanded, so that each source pixel and each depth pixel covers four image pixels, which influences the assignment of image pixels to source pixels from different viewing positions.

It is possible in this connection that the source view Q and the depth card T differ in resolution, e.g., if they are created separately from one another. As a rule, however, both will have the same resolution, so that to each source pixel there corresponds exactly one depth pixel, and vice versa. The depth card T, then, can also be filed as an extra array, with an index of its own, in a matrix in which also the bits of color information of the source view are stored; but it may just as well be treated as a separate, independent field where it is filed, e.g., in a depth buffer that is manipulable by a driver.

If the depth card, the source view and the views $A''$ have identical resolutions, either no scaling, or scaling with a factor 1, is made. In case of an expansion of the source view and a depth card matched with the source view, color artefacts can be eliminated that originate by interaction of the special filter structure for three-dimensional display with the display screen, in which, e.g., pixels are composed of adjacent subpixels of the colors red, green and blue. In case of three-dimensional display, this interaction may possibly lead to the occurrence of shimmering multicolored fringes at boundaries between colors.

On the other hand, the source image and the depth card can be compressed if their resolution is higher than the resolution of the screen used for display. This can be of advantage especially with display screens having full-color pixels or with monochromatic display screens, because an increase in depth precision can be achieved in this way.

What is achieved by means of the invented method, then, is that the effort required for computing the combination image—which effort in prior art substantially depends on the computations in connection with the generation of the views, the so-called rendering to be done for each of the views—essentially depends only on the resolution of the display screen and, for a small part, on the number of views. Thus, it is possible, in principle, to combine any number of views, which leads to a marked increase in the quality of the three-dimensional impression, especially with large-size, high-resolution display screens.

The pixels $b''(x_k,y_l)$ may be either full full-color pixels or subpixels. In the case of full-color pixels, each full-color pixel is assigned bits of color information for the colors red, green and blue; in the case of subpixels, each subpixel is assigned bits of color information for exactly one of these colors.

In a preferred embodiment of the method, the bits of depth information of the depth card T are scaled, so that the depth to be displayed can be adapted, e.g., to a certain type of device, but also to a standard 3D volume, so that a viewer will always get the maximum three-dimensional impression. This scaling is performed by the following steps: In a first step, a plane with a maximum depth and a plane with a minimum depth are defined. This is done with reference to the viewing position $B^q$, i.e., as a rule, normal to the projection plane P(x,y), although other perspectives are generally possible. If one scales the entire depth space, or the range of values which the bits of depth information in the depth card can adopt, to the interval between 0 and 1, the plane with the maximum depth has, as depth information, the value of 1, and the plane with the minimum depth has, as depth information, the value of 0. Commonly, the plane with the minimum depth will hide all source pixels unless they lie in that plane. On the other hand, the plane with the maximum depth should not hide any source pixels unless source pixels lie in it. As a rule, though, source pixels will lie neither in the plane with the minimum depth nor in the plane with the maximum depth, so that the depth impression is less than optimally utilized and can still be optimized. The bits of depth information or depth values of the plane are identical for every point in the plane.

In the next step, the two planes are shifted towards each other, and the smallest distance between the two planes is determined at which all bits of depth information of the depth card still lie in or between these planes. If any depth information should have been on one of the planes when the planes were defined, this plane will not be shifted any further. The shifting is preferably be done in an iterative way, with the position of the plane being shifted by jumps back and forth; the starting point selected for the next iteration step will be one of the previous two iteration steps, which in case of the plane with the maximum depth will be the one covering the smaller number of pixels, and in case of the plane with the minimum depth will be the one covering the greater number of pixels. Herein, the planes are characterized by their—identical—depth value or their identical depth information. Other known iteration methods can also be employed, of course.

Once the two planes have been shifted far enough so that further iteration steps do not result in any further improvement, i.e. once the smallest possible distance has been found, the bits of depth information are scaled to a specified standard distance that depends on this smallest distance. For example, if the standard distance can be defined as 1, and if all bits of depth information of the depth card are in a range from 0.2 to 0.7, scaling can be performed to the a standard distance between 0 and 1, so that the 3D volume available can be utilized to the maximum. The scaling may vary with the depth information in the depth card and need not be linear.

Defining the plane with the maximum depth and/or the plane with the minimum depth in the first step may be effected automatically (e.g., at the depth values 0 and 1), but may just as well be done manually. This is of advantage especially if the respective plane is to be defined on the basis of an assessment of the image content, although this can, of course, also be effected automatically on the basis of appropriate image analysis algorithms. If the planes are initially defined in this way with depth values differing from 0 or 1, respectively, then all depth pixels t whose bits of depth information correspond to values lying in front of the plane with the minimum depth or behind the plane with the maximum depth, respectively, will be assigned uniform/identical depth values. Such objects, then, appear to lie in a plane respectively in front of or behind the volume proper in which other objects are displayed three-dimensionally, and show a two-dimensional image structure only.

The sequence of the steps of the method is preferably controlled by a driver, which also permits manual override. Preferably, control is effected by a driver that is implemented on a graphics card and capable of addressing the graphics card accordingly. The steps of the method, too, are preferably executed on a graphics card that is provided with circuitry optimized for such process steps.

Depending e.g. on process steps performed before, the driver can decide which depth card is used for generating and displaying three-dimensional image, or whether such a depth card has to be created first, or whether an exiting depth card needs to be supplemented. In particular, the depth card may be taken from an application, e.g., from a computer game or a program for the display of medical facts the screen output of which is to be converted from two- to three-dimensionality and for which a depth card is computed for normal two-dimensional display so that objects in the background can be distinguished from those in the foreground.

It is to be understood that within the scope of the present invention, the features mentioned before and explained below are applicable not only in the combinations stated but also in other combinations or as stand-alone features.

BRIEF DESCRIPTION OF THE DRAWINGS

Below, the invention will be explained in greater detail with reference to the accompanying drawings, which also disclose features essential to the invention.

DETAILED DESCRIPTION

Figure 1:
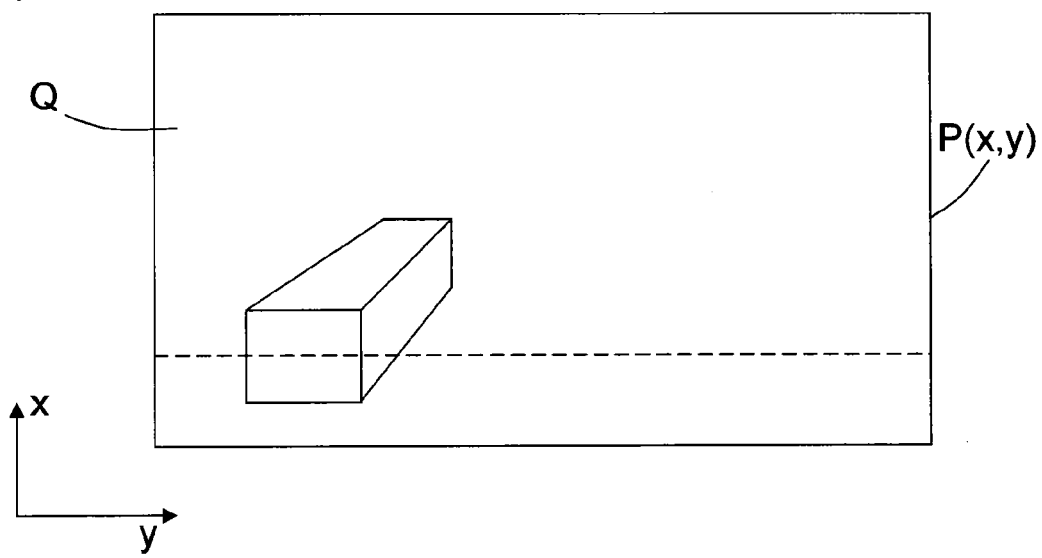
FIG. 1 is an overview of the relationships between projection surface, original view, relief card and the various viewing positions.
Figure 1:
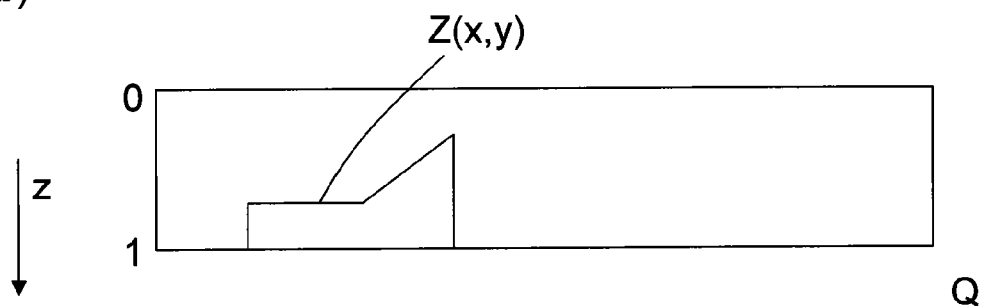

FIG. 1 illustrates the fundamental terms in connection with a method for the three-dimensional display of a scene on a grid of pixels, on the basis of several different views $A^n$ of the scene with n=0, . . . N−1 and a total number of views N>2 or N=2. First, a source view Q projected onto a projection surface P(x,y) with a horizontal coordinate x and a vertical coordinate y is provided. The projection surface P(x,y) is shown in FIG. 1a; here, the scene comprises a single cuboid, apart from which the scene is empty. As shown in FIG. 1b, the source view Q is assigned an original viewing position $B^q$. Furthermore, the source view Q is composed of source pixels $b^q(x_i,y_j)$, with rows j=1, . . . , J and columns i=1, . . . , I. In each source pixel $b^q(x_i,y_j)$, at least one bit of color information is stored. Other information can be stored in addition. For the sake of clarity, the source pixels $b^q(x_i,y_j)$ are not shown here. They can be imagined as a narrow-meshed grid underlying the view Q in FIG. 1a. The original viewing position $B^q$ is assigned to a first view $A^0$. By horizontal shifting of the original viewing position $B^q$, N−1 further pairs of different viewing positions $B^m$ are generated that correspond to the other views $A^m$ with m=1, . . . , N−1. In the present case, N=5.

Other numbers of views can be used as well; generally, n is a natural number greater than or equal to 2.

Also shown in FIG. 1b is a relief card $Z(x,y)$, which is created on the basis of bits of depth information about the source view Q. This depth information is stored in a depth card T that relates to the projection surface. The original viewing position $B^q$ is assigned also to this depth card T. The depth card is composed of depth pixels $b^q(x_i, y_j)$ with rows r=1, ..., R and columns p=1, ..., P. In each depth pixel $b^q(x_i, y_j)$, at least one bit of depth information is stored, with each bit of depth information corresponding to a vertical distance to the projection surface $P(x, y)$. The depth card T and the source view Q, as a rule, have the same dimensions with regard to the number of rows and columns; if this should not be the case, scaling to each other is possible.

Scaling of the depth card T or of the source view Q with appropriate scaling factors is also performed in case that the depth card T and/or the source view Q has a lower or higher resolution than the views $A^n$. If R≠L and/or P≠K, scaling of the depth card T is performed with scaling factors $S^T_x$=K/P or $S^T_y$=L/R, respectively. In case that the source view Q has a lower or higher resolution than the views $A^n$ so that J≠L and/or I≠K, scaling of the source view Q is performed with scaling factors $S^Q_x$=K/I or $S^Q_y$=L/J, respectively. If the resolution of depth card T and source view Q is lower than the resolution of the views $A^n$, color fringes at color boundaries in the 3D display can be reduced, for which purpose one can also artificially reduce the resolution of the source view Q and that of the depth card T by appropriate image algorithms. This procedure is useful especially in case of display screens of earlier make, whose pixels are spaced farther apart than those of screens of more recent make, and where the disturbing effect of color fringes increases with pixel spacing. In case of a higher resolution than that of the views $A^n$, the sense of depth can be improved, especially with monochromatic or full-color-pixel-based screens.

If the resolutions of the source view Q, of the depth card T and the views $A^n$ are identical, the source view Q can be used as the view $A^0$; the bits of depth information are then assigned to the source view Q.

The relief card $Z(x,y)$ is then connected with the source view Q in accordance with the method of relief mapping, e.g., in the manner shown. $Z(x,y)$, in this connection, is a continuous function in x and y. It may, for example, be a staircase function; it is also possible, though, to interpolate the values between den pixels in such a way that the function $Z(x,y)$ is continuously differentiable once or twice; the interpolation may be linear or bicubic, for example. In FIG. 1b, the relief card $Z(x,y)$ is shown for a section through the view Q with constant y; the section is marked by the dashed line in FIG. 1a. Furthermore, the relief card is normalized; small values correspond to low depths and therefore undergo a slight shift only; high values correspond to points in the background, which undergo a smaller shift relative to points in the foreground.

Thereafter, bits of color information for pixels $b''(x_k, y_l)$, with rows l=1, ..., L and columns k=1, ..., K, of the views $A^n$ are determined. Subsequently, all views $A^n$ are combined into a according to a specified combination rule for three-dimensional display, which combination image ids displayed on the grid of pixels in such a way that, according to the combination rule, of each of the views $A^n$ only part of the pixels $b''(x_k, y_l)$ assigned to the respective view $A^n$ are displayed on the grid of pixels, and that propagation directions are fixed for the views $A^n$ so that a viewer's left eye and his right eye will perceive different selections of views $A^n$ and, thus, a visual impression of space is created.

Figures 2, 3A:
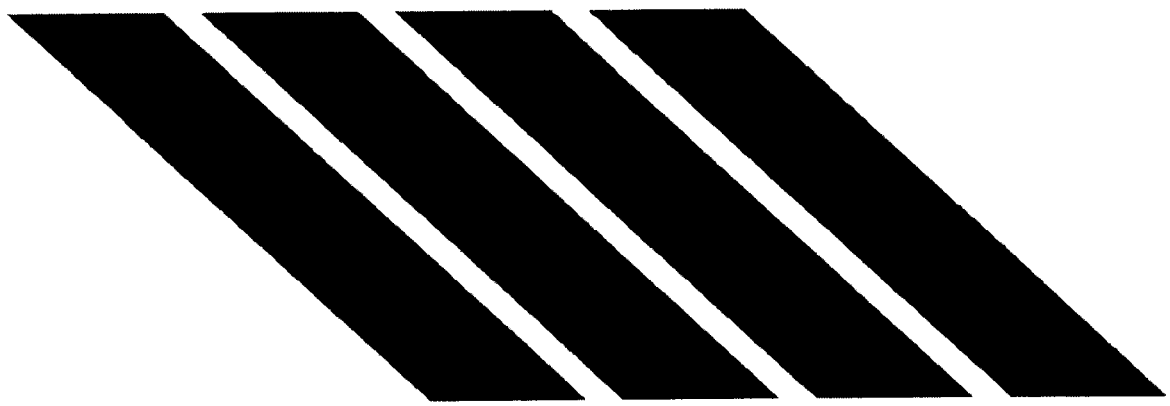
FIG. 2 shows a combination image composed of five views.
FIG. 3a shows a filter structure for determining defined propagation directions.

An example of such a combination image combined according to a combination rule is shown in FIG. 2. This is a combination image intended for display on screens with sub-pixels. According to the rule, adjacent subpixels are assigned different views. The numbers in the boxes below the boxes marked R, G and B designate the index n of the five views $A^n$ used in this example.

Figure 3B:
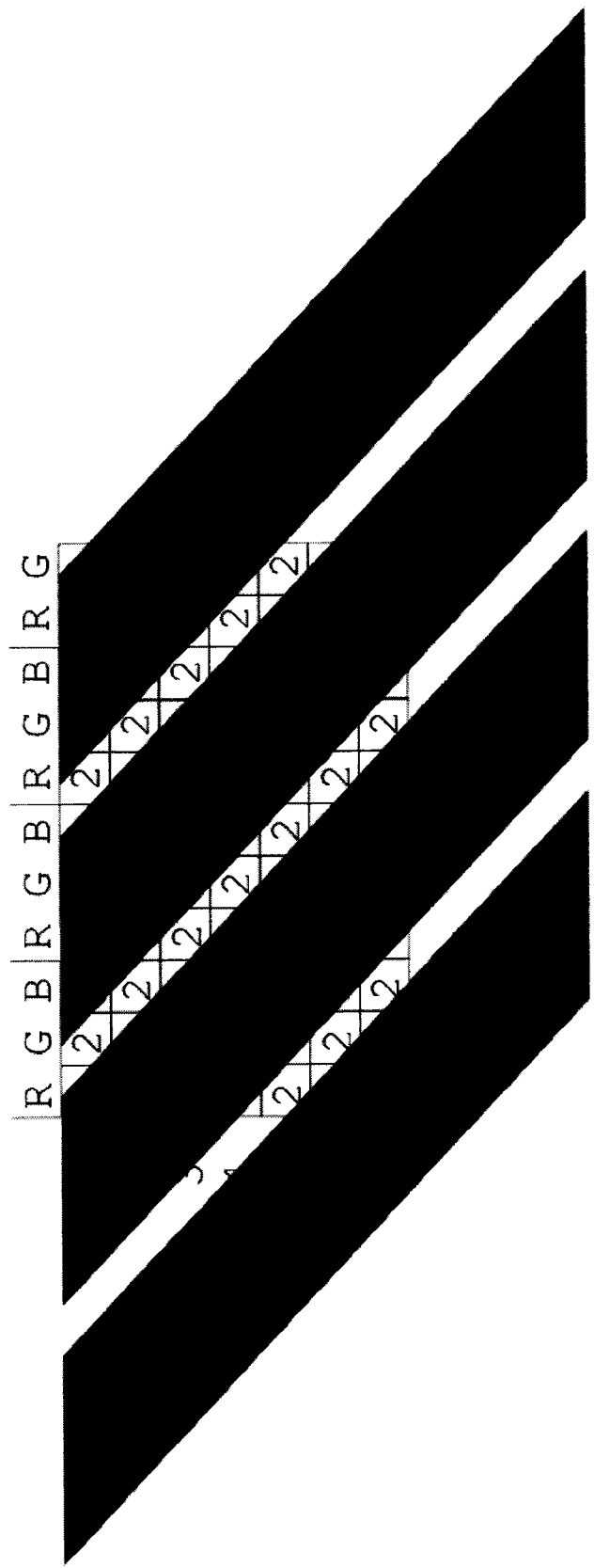
FIGS. 3b,c show the combination image with overlaid filter structure, as perceived by the left and right eye, respectively, in a particular position.
Figure 3C:
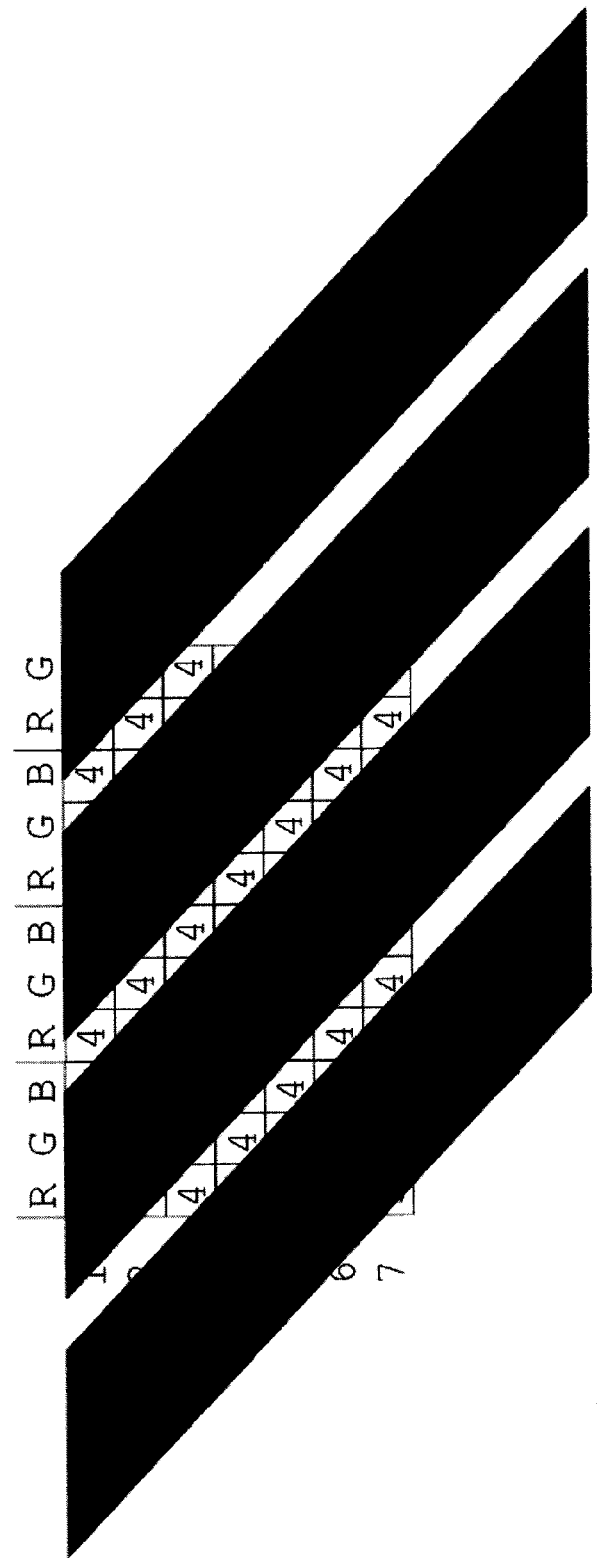

The propagation directions, then, are fixed by appropriate optical filter structures, e.g., by parallactic barrier filters or lenticular filters. Such an optical filter in the form of a barrier structure is shown in FIG. 3a. If a viewer is in a selected position in front of the display screen, it is possible, for example, that the left eye will see only the second view, as shown in FIG. 3b, and the right eye will see only the fourth view, as shown in FIG. 3c. The optical filter structure is arranged (in the viewing direction) in front of or behind the rastered combination image; in this way, propagation directions are fixed that create the visual three-dimensional impression of space.

Figure 4:
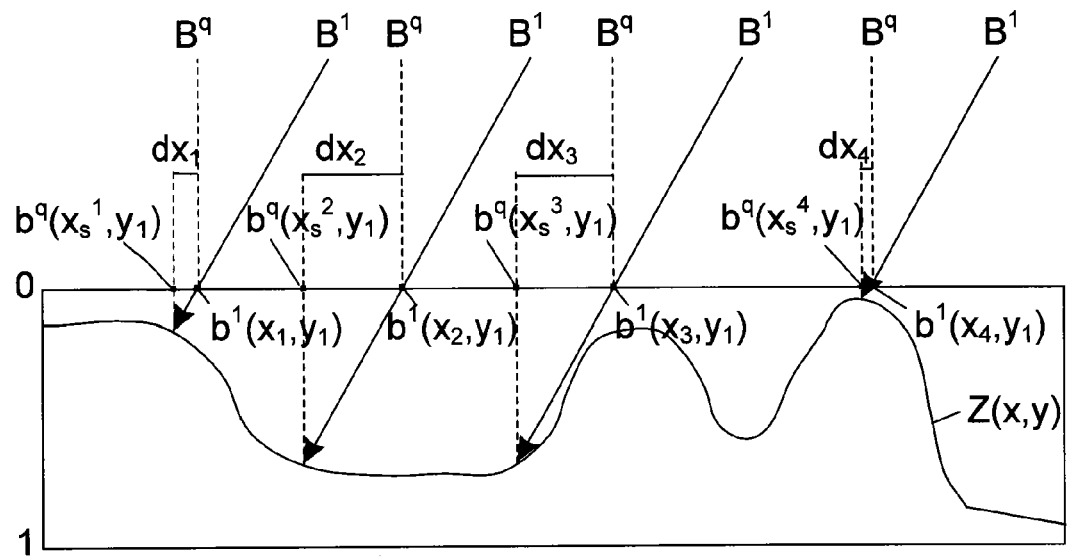
FIG. 4 illustrates the procedure of determining the bits of color information for the other views.

FIG. 4 illustrates the basic procedure of determining the bits of color information for the pixels $b''(x_k, y_l)$ of the views $A^n$. For this purpose, first a ray is traced along a viewing direction from the respective viewing position $B^n$, in the present example $B^1$, to the respective pixel $b''(x_k, y_l)$. In the example, this is shown for four pixels k=1, ..., 4, in the first row (l=1) for the first viewing position $B^1$. The source view Q is, as a rule, computed in such a way that it was determined and projected already in central or orthographic projection. Therefore, no further projection is needed to generate the views $A^n$ from this and the other viewing positions; a parallel shift, corresponding to a shearing of the projection volume, will do. Accordingly, exactly one viewing direction corresponds to each of the views $A^n$ or viewing positions $B^n$.

The viewing directions are then extended into the depth beyond the respective pixel, and the intersection, nearest to the viewing position Bn, of the ray with the relief card $Z(x,y)$ is determined. This is performed by computation, using the connection of the source view Q with the relief card $Z(x,y)$. This procedure corresponds to the procedure for finding these intersections as described in the Prior Art section in the context of relief mapping. In FIG. 4, the intersections are marked by the apices of the arrows of the rays. In finding the intersections one should be sure to really find the closest intersection point only, rather than one hidden by any objects in front of it. This, too, can be implemented by means of suitable algorithms. As a next step, the source pixel $b^q(x_s^i, y_j)$ closest to the intersection is determined. These source pixels are also shown in FIG. 4. As the last step, the color information of this pixel $b^q(x_s^i, y_j)$ of the source view Q is assigned to the respective pixel $b''(x_k, y_l)$. This corresponds to a shifting of the objects according to their depth, indicated by the distances designated $dx_1$, $dx_2$, $dx_3$ and $dx_4$. The relief card $Z(x,y)$ is to be understood in such a way that small values correspond to a smaller depth, and values close to 1 correspond to a high depth; as the viewing position is changed, objects in the background are shifted less than those in the foreground.

It is essential in that connection that the bits of color information for the views $A^n$ are determined only for the pixels $b''(x_k, y_l)$ to be displayed according to the combination rule. For all other pixels, no color information is determined; i.e., these remain out of consideration in the computing, because their information is not required. In short, for each view $A^n$ only the share of pixels $b''(x_k, y_l)$ are determined that are actually displayed according to the combination rule.

Figure 5:
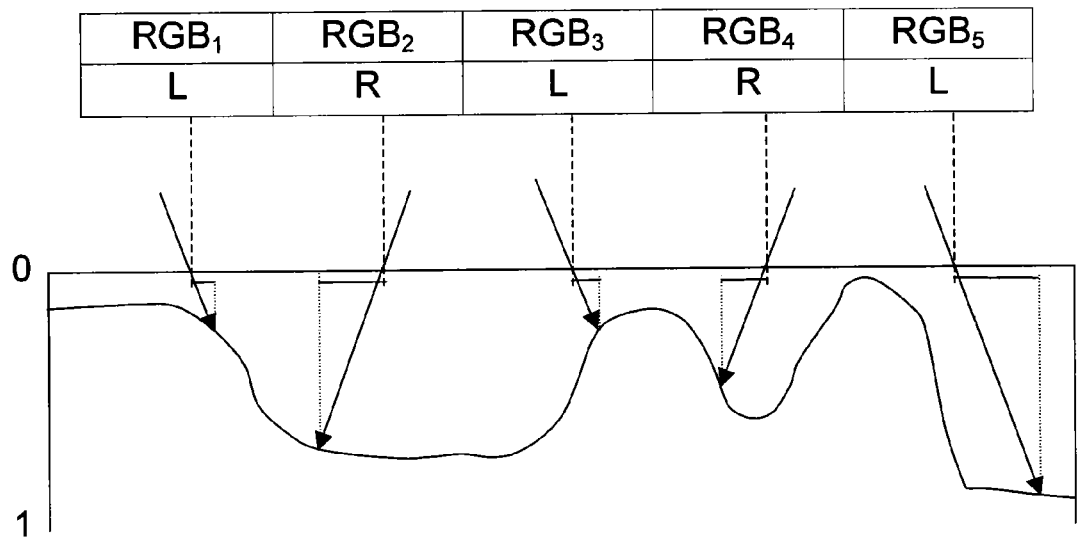
FIG. 5 illustrates the determination of the bits of color information, exemplified by a full-color pixel display screen.

FIG. 5 illustrates the procedure of determining the bits of color information of combination images for a display screen on a full-color pixel basis, on which only two views are displayed, one for the left and one for the right eye. Each full-color pixel contains bits of color information for red (R), green (G) and blue (B). The views for the left and the right eye are designated L and R in FIG. 5; the total number of views is N=2.

Figure 6:
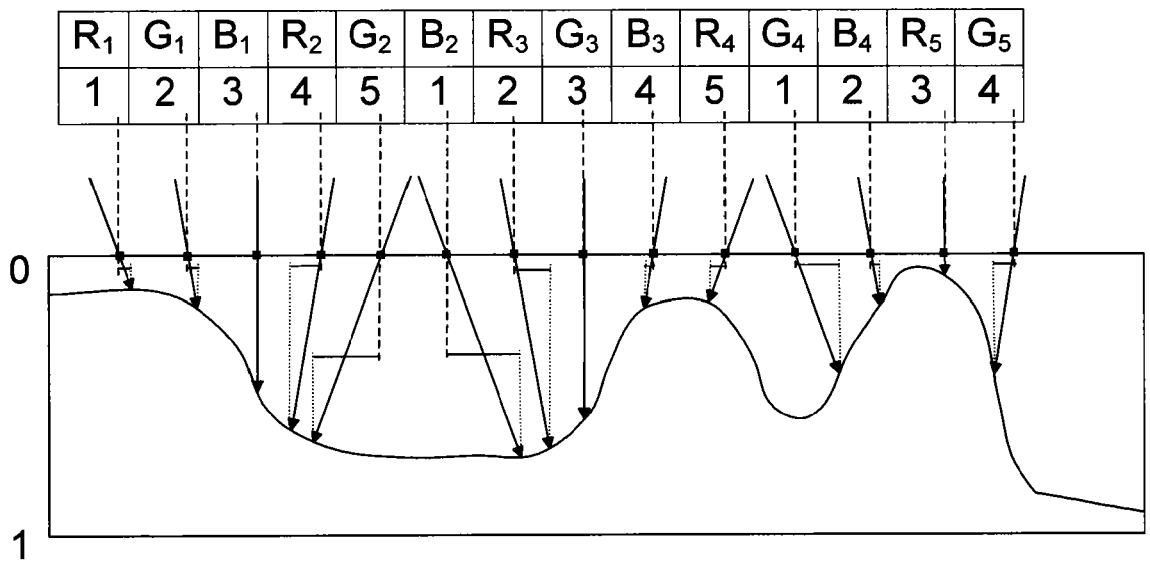
FIG. 6 illustrates the determination of the bits of color information for the pixels to be displayed, exemplified by a display screen with subpixels.

FIG. 6 illustrates the procedure for a display screen on subpixel basis. Here, different views are displayed on adjacent subpixels. The first red subpixel $R_1$ is assigned color information of view 1, the first green subpixel, marked $G_1$, is assigned color information of view 2, etc. Each color value comes from a different view.

Figure 7A:
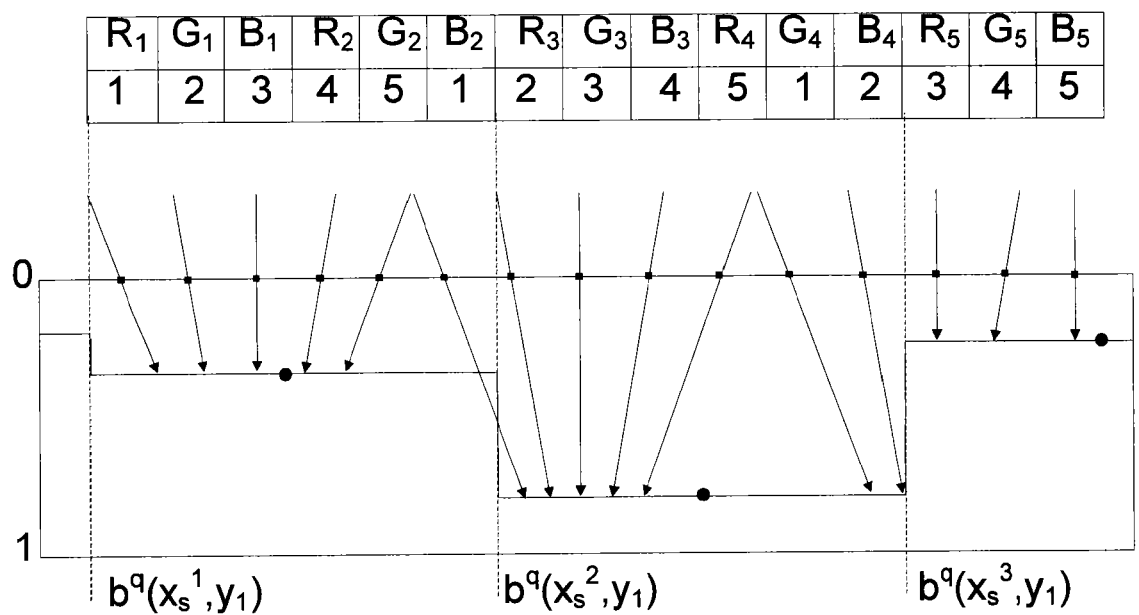
FIGS. 7a,b illustrate a case in which the views have a higher resolution than the depth card and the source view.
Figure 7B:
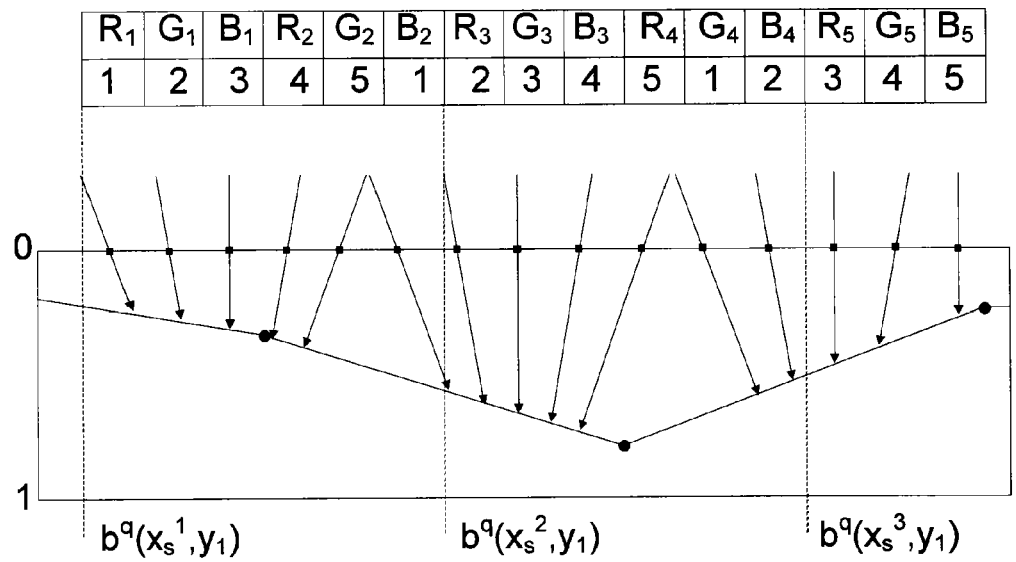
Figure 8:
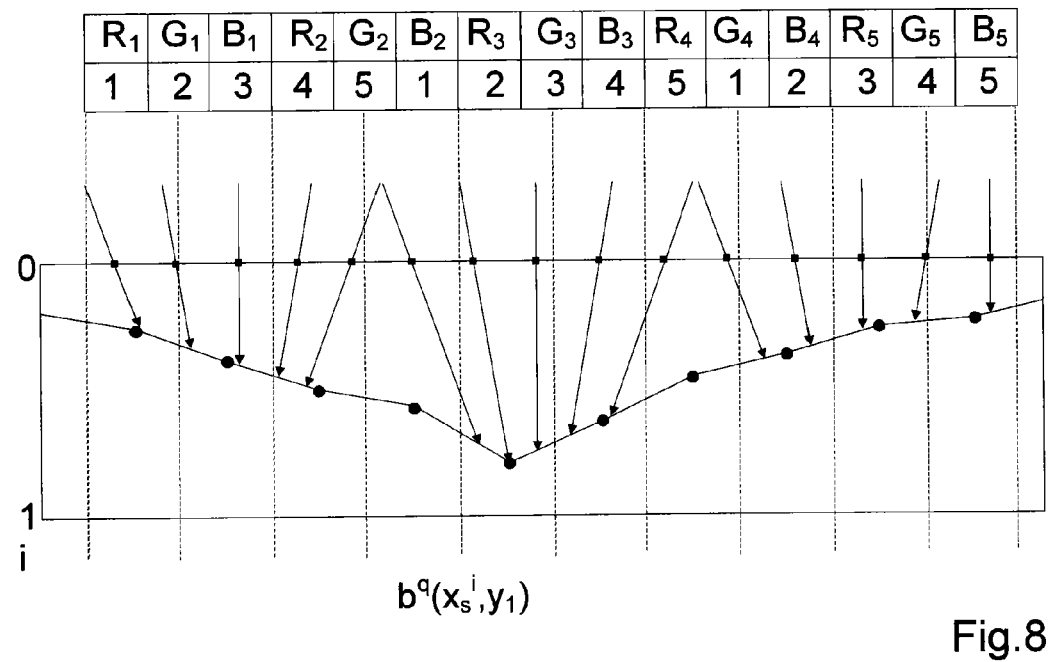
FIG. 8 illustrates the reverse case compared to FIG. 7a,b.

FIG. 7a and FIG. 7b and also FIG. 8 illustrate situations similar to the situation shown in FIG. 6. Whereas there, like in FIG. 4 and FIG. 5, the relief card Z(x,y) shown was interpolated as a twice continuously differentiable function, i.e. with the first derivative also being a continuously differentiable function, the relief card Z(x,y) shown in FIG. 7a is a step function, with each step, corresponding to the depth value, extends over a full-color source pixel; the relief cards Z(x,y) shown in FIG. 7b and FIG. 8 correspond to functions linearly interpolated between the bits of depth information of the source pixels.

FIGS. 7a,b and FIG. 8 illustrate examples of possible scalings with differently dimensioned source views and depth cards on the one hand and views $A^n$ on the other. In case of the situations shown in FIG. 7a and FIG. 7b, the source view Q is, in the horizontal, dimensioned only half as big as the views $A^n$, i.e. it has only half as many columns. Accordingly, the scaling factor $S^Q_x=2$. One source pixel, then, is assigned to two image pixels each. This leads to a substantial reduction of color fringes as occurring if special filters for 3D display are used, e.g. the one shown in FIG. 3a. The depth card T—the bits of depth information are shown as points at the centers of the respective source pixel regions—can be connected with the source view Q in such a way that both always have the same dimensions, i.e. that scaling of the depth card T takes place automatically if the source view Q is scaled. The depth card T can, for example, be another index in the commonly multidimensional matrix of source pixels, so that each source pixel is assigned not only color information, e.g. of three color values, but also depth information, or yet other information. However, the depth card T can also be used independently of the source view Q and be stored, e.g., in a depth buffer, so that it can be independently manipulated and be connected with the source view Q later.

Compared to FIG. 7, FIG. 8 illustrates the reverse situation, with the source view Q having a higher resolution than the views $A^n$, i.e. a resolution exactly twice as high. This contributes to an increase in the accuracy of depth scanning. If, for example, the resolution of the source view Q is three times as high as the resolution of the views $A^n$, each subpixel can be assigned a depth value of its own, which increases the accuracy of depth determination.

The impression of depth can also be improved by a separate treatment of the depth card T, viz. by scaling the bits of depth information as follows: First, a plane with a maximum depth and a plane with a minimum depth relative to the viewing position $B^q$ are defined. These two planes are then shifted towards each other, and the smallest distance between the planes is determined at which the bits of depth information of the depth card T that lay in or between these planes when the planes were defined in the previous step, still all lie in or between these planes. As far as bits of depth information lay in one of the planes already at the maximum depth, this plane will not be shifted, as a rule. In general, the shifting is performed iteratively, so that the smallest distance is found within several iteration steps. Once the smallest distance has been found, the bits of depth information—i.e. the depth values—are scaled to a specified new distance as a function of this smallest distance, so that, as a rule, the 3D depth space available can be optimally utilized.

In a special version of this method, the plane with the maximum depth and/or the plane with the minimum depth can be defined in the first step on the basis of an assessment of the image contents. For example, the plane with the minimum depth can be defined in a range between a foreground information—in a computer game, e.g., the cockpit of a racecar, the driver's cab of a railroad engine, or the cockpit of an airplane—so that the cockpit or the like is in front of this plane. All points in front of this plane, then, have a common depth value, irrespective of the shifting of the two planes towards each other. Scaling of the depth information is then performed only for the depth information lying outside the (two-dimensionally seen) cockpit or the like, so that for this range, which is the one actually of interest to the viewer or player, an optimization of the visual impression of space can be obtained by maximum utilization of the depth space available.

The entire procedure can be controlled by a driver, which may, e.g., be implemented on a graphics card. The steps of the method can readily be performed on a graphics card as well.

In the method described above, the essential effort required for generating the combination image no longer depends on the number of views employed, but only on the resolution of the display screen used. This makes it possible to use a great number of views, which improves the quality of the visual impression of space.

What is claimed is:

1. A method for the three-dimensional display of a scene on the basis of at least two views $A^n$ of the scene, with n= 0, . . . , N−1, on a grid of pixels, the method being a computer-implemented method comprising:
projecting a source view Q onto a projection surface P(x,y) with a horizontal coordinate x and a vertical coordinate y, and assigning an original viewing position $B^q$ to the source view Q, wherein the source view Q is composed of source pixels $b^q(x_i, y_j)$ with rows j=1, . . . , J and columns i=1, . . . , I, and including at least one bit of color information stored in each source pixel $b^q(x_i, y_j)$;
providing a depth card T referenced to the projection surface P(x,y) and assigning the original viewing position $B^q$ to the depth card T, the depth card T comprising depth pixels $t(x_p,y_r)$ with rows r=1, . . . , R and columns p= 1, . . . , P, and including at least one bit of depth information stored in each depth pixel $t(x_p,y_r)$, the depth information corresponding to a vertical distance to the projection surface P(x,y);
assigning the original viewing position $B^q$ to a first view $A^0$ and, by horizontal shifting of the original viewing position $B^q$, generating N−1 additional pairs of viewing positions $B^m$, which differ from pair to pair and correspond to the other views $A^m$, with m=1, . . . , N−1;
determining bits of color information for pixels $b''(x_k, y_l)$ of the views $A^n$, with rows l=1, . . . , L and columns k= 1, . . . , K;
combining the views $A^n$ according to a specified combination rule for three-dimensional display into a combination image which is displayed on the grid of pixels, wherein, according to the combination rule, for each of the views $A^n$, only part of the pixels $b''(x_k, y_l)$ assigned to the respective view $A^n$ are displayed, and propagation directions are fixed for the views $A^n$ so that a viewer's left eye will perceive a different selection of views $A^n$ than the viewer's right eye and, thus, a visual impression of space is created;

performing, if at least one of $R \neq L$ and $P \neq K$, and the depth card T thus has a lower or higher resolution than the views $A^n$, scaling of the depth card T with one of scaling factors $S^T_x = K/P$ and $S^T_y = L/R$;

performing, if at least one of $J \neq L$ or $I \neq K$, and the source view thus has a lower or higher resolution than the views $A^n$, a scaling of the source view with one of scaling factors $S^Q_x = K/I$ and $S^Q_y = L/J$, creating a relief card $Z(x, y)$ of the source view Q on the basis of the depth card T, with $Z(x, y)$ being a continuous function in x and y, and the relief card $Z(x, y)$ being connected with the source view Q;

determining the bits of color information for pixels $b''(x_k, y_l)$ of the views $A^n$, including—
(i) creating a ray along a viewing direction from the respective viewing position $B^n$ to the respective pixel $b''(x_k, y_l)$ and extending the ray beyond the respective pixel into the depth,
(ii) determining the intersection closest to the viewing position $B^n$ of the ray with the relief card $Z(x, y)$,
(iii) determining a source pixel $b^q(x_s^i, y_j)$ closest to the intersection, and
(iv) assigning the respective pixel $b''(x_k, y_l)$ the color information of the source pixel $b^q(x_s^i, y_j)$, wherein the bits of color information for the views $A^n$ are determined only for the pixels $b''(x_k, y_l)$ to be displayed according to the combination rule.

2. The method of claim 1, wherein the pixels $b''(x_k, y_l)$ are full-color pixels, with each full-color pixel being assigned color information for the colors red, green, and blue.

3. The method of claim 1, wherein the pixels $b''(x_k, y_l)$ are subpixels, with each subpixel being assigned color information of exactly one of the colors red, green, or blue.

4. The method of claim 1, further comprising scaling the bits of depth information of the depth card T by:
defining a plane having a maximum depth and a plane having a minimum depth relative to the viewing position $B^q$;
shifting the two planes towards each other, and determining the smallest distance between the two planes at which the bits of depth information of the depth card T that lay in or between these planes still lie in or between these planes; and
scaling the bits of depth information to a specified standard distance, depending on the smallest distance.

5. The method of claim 4, wherein at least one of the plane having the maximum depth and the plane having the minimum depth is defined on the basis of an assessment of the image content.

6. The method of claim 1, wherein the steps of the method are controlled by a driver.

7. The method of claim 6, wherein the driver is implemented on a graphics card.

8. The method of claim 1, wherein the steps of the method are performed on a graphics card.

9. An apparatus facilitating the three-dimensional display of a scene on the basis of at least two views $A^n$ of the scene, with n=0, ..., N−1, on a grid of pixels, the apparatus comprising:
a graphics card having a driver programmed to:
project a source view Q onto a projection surface P(x,y) with a horizontal coordinate x and a vertical coordinate y, and assign an original viewing position $B^q$ to the source view Q, wherein the source view Q is composed of source pixels $b^q(x_i, x_j)$, with rows j=1, ..., J and columns i=1, ..., I, and including at least one bit of color information stored in each source pixel $b^q(x_i, y_j)$;

provide a depth card T referenced to the projection surface P(x,y) and assign the original viewing position $B^q$ to the depth card T, the depth card T comprising depth pixels $t(x_p, y_r)$ with rows r=1, ..., R and columns p=1, ..., P, and including at least one bit of depth information stored in each depth pixel $t(x_p, y_r)$, the depth information corresponding to a vertical distance to the projection surface P(x,y);

assign the original viewing position $B^q$ to a first view $A^0$ and, by horizontal shifting of the original viewing position $B^q$, generate N−1 additional pairs of viewing positions $B^m$, which differ from pair to pair and correspond to the other views $A^m$, with m=1, ..., N−1;

determine bits of color information for pixels $b''(x_k, y_l)$ of the views $A^n$, with rows l=1, ..., L and columns k=1, ..., K;

combine the views $A^n$ according to a specified combination rule for three-dimensional display into a combination image which is displayed on the grid of pixels, wherein, according to the combination rule, for each of the views $A^n$, only part of the pixels $b''(x_k, y_l)$ assigned to the respective view $A^n$ are displayed, and propagation directions are fixed for the views $A^n$ so that a viewer's left eye will perceive a different selection of views $A^n$ than the viewer's right eye and, thus, a visual impression of space is created;

perform, if at least one of $R \neq L$ and $P \neq K$, and the depth card T thus has a lower or higher resolution than the views $A^n$, scaling of the depth card T with one of scaling factors $S^T_x = K/P$ and $S^T_y = L/R$;

perform, if at least one of $J \neq L$ or $I \neq K$, and the source view thus has a lower or higher resolution than the views $A^n$, a scaling of the source view with one of scaling factors $S^Q_x = K/I$ and $S^Q_y = L/J$, creating a relief card $Z(x, y)$ of the source view Q on the basis of the depth card T, with $Z(x, y)$ being a continuous function in x and y, and the relief card $Z(x, y)$ being connected with the source view Q;

determine the bits of color information for pixels $b''(x_k, y_l)$ of the views $A^n$, including to—
(i) create a ray along a viewing direction from the respective viewing position $B^n$ to the respective pixel $b''(x_k, y_l)$ and extending the ray beyond the respective pixel into the depth,
(ii) determine the intersection closest to the viewing position $B^n$ of the ray with the relief card $Z(x, y)$,
(iii) determine a source pixel $b^q(x_s^i, y_j)$ closest to the intersection, and
(iv) assign the respective pixel $b''(x_k, y_l)$ the color information of the source pixel $b^q(x_s^i, x_j)$, wherein the bits of color information for the views $A^n$ are determined only for the pixels $b''(x_k, y_l)$ to be displayed according to the combination rule.

10. The apparatus of claim 9, wherein the pixels $b''(x_k, y_l)$ are full-color pixels, with each full-color pixel being assigned color information for the colors red, green, and blue.

11. The apparatus of claim 9, wherein the pixels $b''(x_k, y_l)$ are subpixels, with each subpixel being assigned color information of exactly one of the colors red, green, or blue.

12. The apparatus of claim 9, wherein the graphics card driver is further programmed to scale the bits of depth information of the depth card T, including to:

define a plane having a maximum depth and a plane having a minimum depth relative to the viewing position $B^q$;

shift the two planes towards each other, and determining the smallest distance between the two planes at which the bits of depth information of the depth card T that lay in or between these planes still lie in or between these planes; and scale the bits of depth information to a specified standard distance, depending on the smallest distance.

13. The apparatus of claim 12, wherein at least one of the plane having the maximum depth and the plane having the minimum depth is defined on the basis of an assessment of the image content.

14. An apparatus facilitating the three-dimensional display of a scene on the basis of at least two views $A^n$ of the scene, with n=0, ..., N−1, on a grid of pixels, the apparatus comprising:

means for projecting a source view Q onto a projection surface P(x,y) with a horizontal coordinate x and a vertical coordinate y, and assigning an original viewing position $B^q$ to the source view Q, wherein the source view Q is composed of source pixels $b^q(x_i, y_j)$, with rows j=1, ..., J and columns i=1, ..., I, and including at least one bit of color information stored in each source pixel $b^q(x_i, y_j)$;

means for providing a depth card T referenced to the projection surface P(x,y) and assigning the original viewing position $B^q$ to the depth card T, the depth card T comprising depth pixels $t(x_p, y_r)$ with rows r=1, ..., R and columns p=1, ..., P, and including at least one bit of depth information stored in each depth pixel $t(x_p, y_r)$, the depth information corresponding to a vertical distance to the projection surface P(x,y);

means for assigning the original viewing position $B^q$ to a first view $A^0$ and, by horizontal shifting of the original viewing position $B^q$, generating N−1 additional pairs of viewing positions $B^m$, which differ from pair to pair and correspond to the other views $A^m$, with m=1, ..., N−1;

means for determining bits of color information for pixels $b''(x_k, y_l)$ of the views $A^n$, with rows l=1, ..., L and columns k=1, ..., K;

means for combining the views $A^n$ according to a specified combination rule for three-dimensional display into a combination image which is displayed on the grid of pixels, wherein, according to the combination rule, for each of the views $A^n$, only part of the pixels $b''(x_k, y_l)$ assigned to the respective view $A^n$ are displayed, and propagation directions are fixed for the views $A^n$ so that a viewer's left eye will perceive a different selection of views $A^n$ than the viewer's right eye and, thus, a visual impression of space is created;

means for performing, if at least one of R≠L and P≠K, and the depth card T thus has a lower or higher resolution than the views $A^n$, scaling of the depth card T with one of scaling factors $S^T_x = K/P$ and $S^T_y = L/R$;

means for performing, if at least one of J≠L or I≠K, and the source view thus has a lower or higher resolution than the views $A^n$, a scaling of the source view with one of scaling factors $S^Q_x = K/I$ and $S^Q_y = L/J$, creating a relief card Z(x, y) of the source view Q on the basis of the depth card T, with Z(x, y) being a continuous function in x and y, and the relief card Z(x, y) being connected with the source view Q;

means for determining the bits of color information for pixels $b''(x_k, y_l)$ of the views $A^n$, including—
  (i) means for creating a ray along a viewing direction from the respective viewing position $B^n$ to the respective pixel $b''(x_k, y_l)$ and extending the ray beyond the respective pixel into the depth,
  (ii) means for determining the intersection closest to the viewing position $B^n$ of the ray with the relief card Z(x, y),
  (iii) means for determining a source pixel $b^q(x_s^i, y_j)$ closest to the intersection, and
  (iv) means for assigning the respective pixel $b''(x_k, y_l)$ the color information of the source pixel $b^q(x_s^i, y_j)$, wherein the bits of color information for the views $A^n$ are determined only for the pixels $b''(x_k, y_l)$ to be displayed according to the combination rule.

15. The apparatus of claim 14, wherein the pixels $b''(x_k, y_l)$ are full-color pixels, with each full-color pixel being assigned color information for the colors red, green, and blue.

16. The apparatus of claim 14, wherein the pixels $b''(x_k, y_l)$ are subpixels, with each subpixel being assigned color information of exactly one of the colors red, green, or blue.

17. The apparatus of claim 14, further comprising means for scaling the bits of depth information of the depth card T by:

means for defining a plane having a maximum depth and a plane having a minimum depth relative to the viewing position $B^q$;

means for shifting the two planes towards each other, and determining the smallest distance between the two planes at which the bits of depth information of the depth card T that lay in or between these planes still lie in or between these planes; and means for scaling the bits of depth information to a specified standard distance, depending on the smallest distance.

18. The apparatus of claim 17, wherein at least one of the plane having the maximum depth and the plane having the minimum depth is defined on the basis of an assessment of the image content.

* * * * *

UNITED STATES PATENT AND TRADEMARK OFFICE
CERTIFICATE OF CORRECTION

PATENT NO. : 8,797,383 B2  Page 1 of 1
APPLICATION NO. : 13/318999
DATED : August 5, 2014
INVENTOR(S) : Alexander Schmidt It is certified that error appears in the above-identified patent and that said Letters Patent is hereby corrected as shown below:

In the Specification

Col. 8, line 36, delete "Bn" and insert --$B^n$--

Signed and Sealed this
Third Day of March, 2015

Michelle K. Lee
*Deputy Director of the United States Patent and Trademark Office*